(12) United States Patent
Robb et al.

(10) Patent No.: US 7,928,041 B2
(45) Date of Patent: *Apr. 19, 2011

(54) METHODS OF TREATING A PORTION OF A WELL WITH A POLYMER OR POLYMER SYSTEM CAPABLE OF FORMING A GEL THAT DISSOLVES AT A LOW AND HIGH PH

(75) Inventors: Ian D. Robb, Lawton, OK (US); Mike A. Bajomo, London (GB); Alexander Bismarck, Peterborough (GB); Joachim Steinke, London (GB)

(73) Assignee: Halliburton Energy Services, Inc., Duncan, OK (US)

( * ) Notice: Subject to any disclaimer, the term of this patent is extended or adjusted under 35 U.S.C. 154(b) by 139 days.

This patent is subject to a terminal disclaimer.

(21) Appl. No.: 12/381,535

(22) Filed: Mar. 12, 2009

(65) Prior Publication Data

US 2010/0234251 A1 Sep. 16, 2010

(51) Int. Cl.
*C09K 8/60* (2006.01)
*C09K 8/588* (2006.01)
*C23F 11/14* (2006.01)
*E21B 43/26* (2006.01)

(52) U.S. Cl. ...... 507/219; 507/225; 507/244; 166/305.1
(58) Field of Classification Search .................. 507/219, 507/225, 244; 166/305.1
See application file for complete search history.

(56) References Cited

U.S. PATENT DOCUMENTS 6,376,631 B1  4/2002  Young et al. ............... 526/260

(Continued)

FOREIGN PATENT DOCUMENTS

GB  2416792 A  8/2006

(Continued)

OTHER PUBLICATIONS

James M. Griffin, Ian Robb and Alexander Bismark, "Preparation and Characterization of Surfatant-Free Stimuli-Sensitive Microgel Dispersions", Journal of Applied Polymer Science, vol. 104, 1912-1919, 2007.
PCT International Search Report, PCT/GB2010/00461; issued Jun. 7, 2010.

*Primary Examiner* — Timothy J. Kugel
*Assistant Examiner* — Aiqun Li
(74) *Attorney, Agent, or Firm* — Robert A. Kent; Booth Albanesi Schroeder LLC

(57) ABSTRACT

Methods for treating a portion of a well include the steps of: (a) forming a treatment gel comprising a polymer or a polymer system of a mixture of two or more polymers, wherein the polymer or the polymer system is capable of each of the following, when tested at least one concentration in the range of 2-10 times C* in deionized water, at about 22° C., and at about 1 atmosphere pressure: (i) forming a polymer gel of the polymer and water at least one pH in the range of 4-9, wherein a bulk form of the polymer gel has a G' greater than G" at all frequencies in the range of 1 rad/sec-100 rad/sec; (ii) dissolving at least one pH in the range of 2-4; and (iii) dissolving at least one pH in the range of 9-12; (b) dispersing the treatment gel in a fluid to form a treatment fluid; (c) introducing the treatment gel in a treatment fluid into a portion of a well; and (d) after the step of introducing the treatment gel, adjusting the pH of the treatment gel to at least one pH in the range of 2-4 or 9-12.

23 Claims, 5 Drawing Sheets

| U.S. PATENT DOCUMENTS | | | |
|---|---|---|---|
| 6,767,869 B2 | 7/2004 | DiLullo et al. | 507/244 |
| 7,306,040 B1 | 12/2007 | Robb et al. | 166/300 |
| 7,399,732 B2 | 7/2008 | Allan et al. | 507/240 |
| 2003/0083403 A1 | 5/2003 | Dawson et al. | |
| 2006/0030493 A1* | 2/2006 | Segura | 507/244 |

| FOREIGN PATENT DOCUMENTS | | |
|---|---|---|
| WO | 0071240 A1 | 11/2000 |
| WO | WO 03/057351 A1 | 7/2003 |

* cited by examiner

METHODS OF TREATING A PORTION OF A WELL WITH A POLYMER OR POLYMER SYSTEM CAPABLE OF FORMING A GEL THAT DISSOLVES AT A LOW AND HIGH PH

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

SUMMARY OF THE INVENTION

The field of the inventions is treating wells for the purpose of producing oil or gas. More particularly, the inventions provide methods for treating a portion of a well. According to a first aspect of the inventions, the methods employ a polymer having certain capabilities. According to a second aspect of the inventions, the methods employ a polymer system of a mixture of at least two or more different polymers that in combination have the certain capabilities.

According to the first aspect of the inventions, the methods include the steps of: (a) forming a treatment gel comprising a polymer, wherein the polymer is capable of each of the following, when tested at least one concentration in the range of 2-10 times C* in deionized water, at about 22° C., and at about 1 atmosphere pressure: (i) forming a polymer gel of the polymer and water at least one pH in the range of 4-9, wherein a bulk form of the polymer gel has a G' greater than G" at all frequencies in the range of 1 rad/sec-100 rad/sec; (ii) dissolving at least one pH in the range of 2-4; and (iii) dissolving at least one pH in the range of 9-12; (b) dispersing the treatment gel in a fluid to form a treatment fluid; (c) introducing the treatment gel in the treatment fluid into a portion of a well; and (d) after the step of introducing the treatment gel, adjusting the pH of the treatment gel to at least one pH in the range of 2-4 or 9-12.

According to the second aspect of the inventions, the methods include the steps of: (a) forming a treatment gel comprising a polymer system of a mixture of two or more polymers, wherein the polymer system is capable of each of the following, when tested at least one concentration in the range of 2-10 times C* in deionized water, at about 22° C., and at about 1 atmosphere pressure: (i) forming a polymer gel of the polymer system and water at least one pH in the range of 4-9, wherein a bulk form of the polymer gel has a G' greater than G" at all frequencies in the range of 1 rad/sec-100 rad/sec; (ii) dissolving at least one pH in the range of 2-4; and (iii) dissolving at least one pH in the range of 9-12; (b) dispersing the treatment gel in a fluid to form a treatment fluid; (c) introducing the treatment gel in the treatment fluid into a portion of a well; and (d) after the step of introducing the treatment gel, adjusting the pH of the treatment gel to at least one pH in the range of 2-4 or 9-12.

As used herein, the words "comprise," "have," "include," and all grammatical variations thereof are each intended to have an open, non-limiting meaning that does not exclude additional elements or steps. As used herein, the word "about" regarding a value means the value plus or minus 10%.

BRIEF DESCRIPTION OF THE DRAWING

The accompanying drawing is incorporated into and form a part of the specification to illustrate examples according to the presently most-preferred embodiments of the present inventions. The drawing is only for illustration of the inventions and is not to be construed as limiting the inventions to only the illustrated and described examples. The drawing includes the following figures.

DETAILED DESCRIPTION OF THE INVENTIONS

Figure 1:
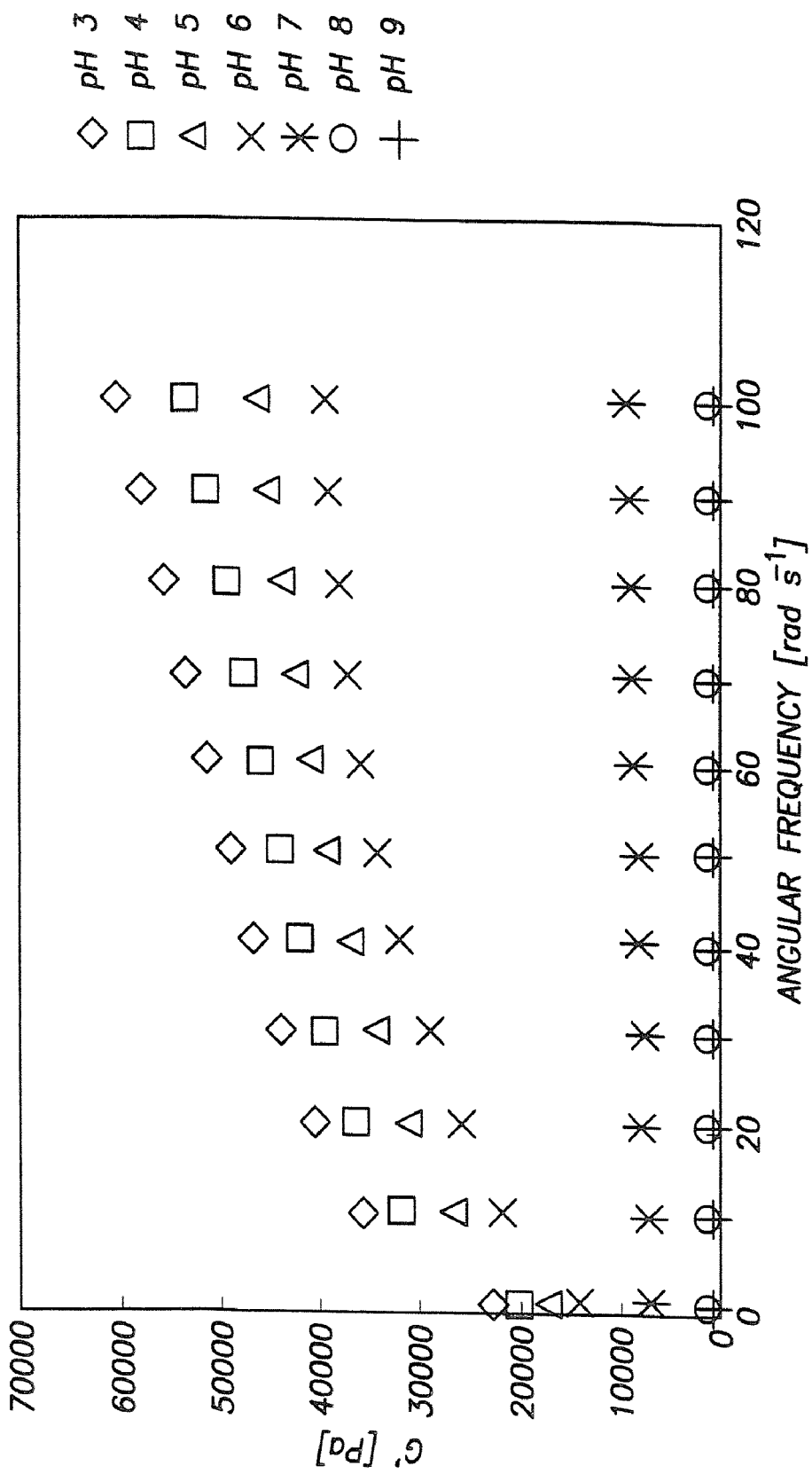
FIG. 1 is a graph of the storage modulus versus angular frequency of a polymer gel at 20 wt % monomers in water.

Oil and gas hydrocarbons are naturally occurring in some subterranean formations. Subterranean formations that contain oil or gas are called reservoirs. The reservoirs may be located under land or off-shore.

In order to produce oil or gas, a well is drilled into a subterranean formation, which may be a reservoir or adjacent to a reservoir.

Various types of treatments are commonly performed on a well. For example, stimulation is a type of treatment performed on a well or subterranean formation to restore or enhance the productivity of oil and gas from the well or subterranean formation. Stimulation treatments fall into two main groups; hydraulic fracturing and matrix treatments. Fracturing treatments are performed above the fracture pressure of the subterranean formation to create or extend a highly-permeable flow path between the formation and the wellbore. Other types of well treatments include, for example, fluid loss control, controlling excessive water production, and sand control. Certain treatment operations, such as treatments to prevent fluid loss or control high water production, often utilize a treatment gel. For example, particles of a treatment gel can be suspended in a treatment fluid and introduced into a wellbore to treat the desired portion of a well. The treatment gel can be used to coat the face of a subterranean formation to form a filtercake on the face of the formation. A filtercake is a relatively impermeable barrier that acts to help prevent water or other fluids from penetrating into or out of a portion of a wellbore. After the treatment, it is often desirable to remove the filtercake, preferably as completely as possible.

As used herein, the words "treatment" and "treating" mean adapted for resolving a condition of a well. As used herein, a "treatment fluid" means the specific composition of a fluid at the time the fluid is being introduced into a wellbore. As used herein, a "treatment gel" means the specific composition of a gel at the time the gel is being introduced into a wellbore. A treatment fluid or treatment gel is typically adapted to be used to resolve a specific condition of a well, such as stimulation, isolation, or control of reservoir gas or water.

According to a first aspect of the inventions, the methods employ a polymer capable of forming a polymer gel at a middle pH and capable of dissolving at a low and at a high pH, as hereinafter described in detail. According to a second aspect of the inventions, the methods employ a polymer system of a mixture of at least two different polymers that, in combination, have such capabilities. The polymer or polymer system can be used to form a treatment gel or to help form a treatment gel. The polymer or polymer system imparts at least some of its capabilities to a treatment gel that is at least partially formed with the polymer or polymer system. The methods include the step of introducing the treatment gel in a treatment fluid into a portion of a well and, after the step of introducing the treatment gel, adjusting the pH of the treatment gel. Adjusting the pH of the treatment gel can be used to help dissolve the treatment gel. Dissolving the treatment gel helps to remove the treatment gel from the well.

It should be understood that as used herein the singular of the word "polymer" refers to polymer molecules having a similar structure to one another, whereas the plural form "polymers" refers to polymer molecules having a dissimilar structure to one another. As used herein, having a similar structure to one another means: (a) for a homopolymer, molecules having the same repeating unit; and (b) for a copolymer, molecules having the same repeating units in substantially the same ratio and in substantially the same sequential pattern (for example, alternating, random, or block). As used herein, "substantially the same ratio" and "substantially the same sequential pattern" means as inferred from the polymerization conditions, as would be understood by a polymer chemist. The identity of a polymer and whether it is the same or different than another polymer is usually at least partly inferred from the monomer(s) from which the polymer is formed and the polymerization conditions.

Another important characteristic of a polymer is the "degree of polymerization." The "degree of polymerization" is the average number of times the repeating unit(s) are in the polymer molecules produced by a polymerization reaction. The degree of polymerization of a polymer also has an impact on the physical characteristics of the polymer, for example, its solubility in water or its elasticity. Thus, the characterization of a polymer often includes its degree of polymerization. Sometimes a polymer is characterized by its average molecular weight, which is proportionally related to its degree of polymerization.

As used herein, a "polymer" preferably has a degree of polymerization of at least 100. Preferably, a polymer for use in the present inventions has a degree of polymerization in the range of 100 to about 10,000.

The conditions of a polymerization reaction can be adjusted to help control the degree of polymerization. The conditions of the polymerization reaction can also be adjusted to help control the sequence of the repeating units in a copolymer, which can also affect the chemical or physical characteristics of the polymer.

As used herein, a "polymer system" is a mixture of two or more different polymers for which the mixture of polymers has the desired capabilities. Typically, the polymers of a polymer system are polymerized separately and then combined into a polymer system. Two polymers of a polymer system can differ, for example, in the structures or ratio of the repeating units that make up each of the polymers.

The present inventions provide methods for treating a portion of a well. According to the inventions, it is desirable to employ a polymer or polymer system, wherein the polymer or polymer system is capable of each of the following, when tested at least one concentration in the range of 2-10 times $C^*$ in deionized water, at about 22° C., and at about 1 atmosphere pressure: (i) forming a polymer gel of the polymer or polymer system and water at at least one pH in the range of 4-9, wherein a bulk form of the polymer gel has a G' greater than G" at all frequencies in the range of 1 rad/sec-100 rad/sec; (ii) dissolving at least one pH in the range of 2-4; and (iii) dissolving at least one pH in the range of 9-12.

$C^*$ is the concentration of polymer chains at which the chains just touch at their edges, i.e., the "overlap concentration" (Iwao Teraoka, *Polymer Solutions*, Wiley 2002, page 64).

Regarding a polymer gel, elastic modulus (G') is a measure of the tendency of a substance to be deformed elastically (i.e., non-permanently) when a force is applied to it and returned to its normal shape. Elastic modulus is expressed in units of pressure, for example, Pa (Pascals) or dynes/cm$^2$.

Loss modulus (G") is a measure of the energy lost when a substance is deformed. G" is also expressed in units of pressure, for example, Pa (Pascals) or dynes/cm$^2$. When comparing G' to G" of a polymer gel, the units of both G' and G" should be the same.

Preferably, the polymer or polymer system is capable of, when tested at least one concentration in the range of 2-10 times $C^*$ in deionized water, at about 22° C., and at about 1 atmosphere pressure, forming a polymer gel at every pH in the pH range of 5-8. Preferably, the polymer or polymer system is capable of, when tested under the above conditions, dissolving at least one pH in the range of 2-3. Preferably, the polymer or polymer system is capable of, when tested under the above conditions, dissolving at least one pH in the range of 10-12. Most preferably, the polymer or polymer system is capable of, when tested under the above conditions, both dissolving at least one pH in the range of 2-3 and dissolving at least one pH in the range of 10-12. As used herein, the term "dissolving" regarding a polymer or a polymer system means that G' becomes <G" at all frequencies in the range of 1 rad/sec-100 rad/sec.

It should be understood that testing of the polymer or polymer system is not a necessary step to the practice of the methods of the inventions provided it is established that the polymer or polymer system is known to have the specified capabilities.

As used herein, a "cross link" or "cross linking" is a connection between two polymer molecules. It is presently believed that to cross link a polymer or a polymer system sufficiently in water to form a polymer gel requires at least one mole of cross link per mole of polymer. In other words, it is presently believed that an average of at least one cross link for each polymer molecule is required to form a sufficiently cross-linked network of the polymer molecules to form a polymer gel.

A cross-link between two polymer molecules can be formed by a direct interaction between the polymer molecules, or conventionally, by using a cross-linking agent that reacts with the polymer molecules to link the polymer molecules.

A disadvantage associated with conventional cross-linked gelling agents is that the resultant gel residue is often difficult to remove from the subterranean formation once the treatment has been completed. For example, in fracturing treatments, the cross-linked gels used are thought to be difficult to clean up completely with conventional breakers, such as oxidizers or enzymes. Similarly, the gel residue can be difficult and time-consuming to remove from the subterranean formation. The gel residue, at some point in the completion operation, usually should be removed to restore the formation's permeability, preferably to at least its original level. If the formation permeability is not restored to its original level, production levels can be reduced significantly. This gel residue often requires long cleanup periods. Moreover, an effective cleanup usually requires fluid circulation to provide high driving force, which is thought to allow diffusion to take place to help dissolve the concentrated buildup of the gel residue. Such fluid circulation, however, may not be feasible. Additionally, in lower temperature wells (i.e., those below about 80° F.), it is often difficult to find an internal breaker for the viscosified treatment fluids that will break the gel residue effectively. The term "break" (and its derivatives) as used herein refers to a reduction in the viscosity of the viscosified treatment fluid, e.g., by the breaking or reversing of the cross-links between polymer molecules or some reduction of the size of the gelling agent polymers. No particular mechanism is implied by the term.

Another problem presented by conventional cross-linked gelling agent systems with respect to cleanup is that the high temperature of the formations (e.g., bottom hole temperatures of about 200° F. or greater) often require cross-linking agents that are more permanent, and, thus, harder to break. Examples include transition metal cross-linking agents. These more permanent cross-linking agents can make cleanup of the resulting gel residue more difficult.

According to the inventions, except for pH adjustment, the polymer or the polymer system is capable of, under the specified test conditions, cross-linking to form a polymer gel without a cross-linking agent for the polymer or the polymer system. Accordingly, the testing of the polymer or the polymer system is without the addition of a covalent or ionic cross-linking agent. As used herein, a "cross-linking agent" is a chemical compound that is added to the polymer molecules to facilitate linking between the polymer molecules. In other words, a cross-linking agent is not a chemical functionality of the polymer molecules.

According to the presently more-preferred embodiments of the inventions, the cross-linking of the polymer or the polymer system is at least primarily via electrostatic attraction between the polymer molecules. It is presently believed that cross-linking via electrostatic attraction can be controlled, that is, by altering the number of charges per unit length of groups along the polymer chains (i.e., switching some charges on or off) by adjusting the pH. While other types of cross-linking can be present, the ratio of cross-linking via electrostatic attraction must be at least sufficient to provide the ability to use pH adjustment to help control the formation of a polymer gel or to help dissolve the polymer or the polymer system.

Preferably, the ratio of mole of cross-link via electrostatic attraction to mole of polymer should be in a range that the polymer or polymer system is capable of each of the following, when tested at least one concentration in the range of 2-10 times C* in deionized water, at about 22° C., and at about 1 atmosphere pressure, forming a polymer gel of the polymer or polymer system and water at least one pH in the range of 4-9, wherein a bulk form of the polymer gel has a $G'$ greater than $G''$ at all frequencies in the range of 1 rad/sec-100 rad/sec. However, at least some of the cross-linking via electrostatic attraction should either not be able to form or should break at a low pH and at a high pH. More particularly, the ratio of mole of cross-link via electrostatic attraction to mole of polymer should be at least sufficiently low at least one pH in the range of 2-4 and at least one pH in the range of 9-12 so that the polymer or polymer system dissolves. Thus, adjusting the pH of such a polymer gel can be used to dissolve a polymer gel formed with such a polymer or polymer system.

Preferably, the polymer or the polymer system has a ratio of cross-links via electrostatic attraction that is greater than one mole of cross-link per mole of polymer. Preferably, the polymer or the polymer system has less than one mole of covalent cross-links per mole of polymer. More preferably, the polymer or the polymer system has less than 0.5 mole of covalent cross-links per mole of polymer. Similarly, the polymer or the polymer system preferably has less than one mole of ionic cross-links of strong acid functional groups (e.g., sulfates) and strong base functional groups per mole of polymer. More preferably, the polymer or polymer system has less than 0.5 mole of ionic cross-links of strong acid or base functionalities per mole of polymer. Generally, ionic cross-links of strong acid or bases functionalities are not susceptible to being broken either at a pH in the range of 2-3 or at a pH in the range of 10-12.

According to a preferred embodiment of the first aspect of the inventions, a class of a polymer having at least some species meeting the desired capabilities is provided. The class of polymer has polymer molecules including both weak acid functional groups and weak base functional groups. As used herein, the term "weak acid" means an acid that has a $pK_a$ in the range of 2-5. An example of a weak acid functional group is a carboxylic acid. As used herein, the term "weak base" means a base that has a $pK_b$ in the range of 8-10. An example of a weak base functional group is a primary, secondary, or tertiary amine. Such a polymer is believed to be capable of forming reversible cross-links via electrostatic attraction between the two types of functional groups at least one mid-range pH, that is, at least one pH in the range of 4-9.

The class of polymer having both weak acid functional groups and weak base functional groups preferably has a ratio of at least one mole of weak acid functional groups per mole of polymer and a ratio of at least one mole of weak base functional groups per mole of polymer. The weak acid functional groups and the weak base functional groups are able to form cross-links via electrostatic attraction at least one mid-range pH, that is, at least one pH in the range of 4-9. More preferably, the class of polymer has such ratios that are at least sufficient for the polymer or the polymer system to form a sufficient ratio of moles of electrostatic cross-link per mole of polymer to form a polymer gel at least one mid-range pH.

It is presently believed, however, that the polymer or polymer system should not be able to form such a high ratio of the mole of cross-link per mole of polymer that the polymer or polymer system precipitates rather than being capable of forming a polymer gel. It is believed that just as a weak acid functional group and a weak base functional group tend to have an electrostatic attraction for each other, two weak acid functional groups or two weak base functional groups tend to be repelled by each other. Thus, the number, separation, and randomness of the weak acid functional groups and of the weak base functional groups on each of the polymer molecules are factors in the resulting ratio of moles of cross-linking via electrostatic attraction to moles of polymer.

For example, the class of polymer preferably contains at least 10% weak acid functional groups based on the degree of polymerization of the polymer. The class of polymer preferably contains at least 10% weak base functional groups based on the degree of polymerization of the polymer. More preferably, the polymer contains 10%-70% weak acid functional groups based on the degree of polymerization of the polymer. More preferably, the polymer contains 10%-70% weak base functional groups based on the degree of polymerization of the polymer. Any remaining percentage of the degree of polymerization of the polymer is preferably non-ionic.

The polymer preferably has a ratio of weak acid functional groups to weak base functional groups that is in the range of 1:4-4:1 on a mole basis. More preferably, the polymer has a ratio of the weak acid functional groups to the weak base functional groups that is in the range of 3:7-7:3 on a mole basis.

In general, the polymer or polymer system has a ratio of weak acid functional groups to weak base functional groups and with molecular structures that provide a polymer gel, not a precipitate.

The weak acid functional groups of the polymer can include more than one type of weak acid functional group. The weak base functional groups of the polymer can include more than one type of weak base functional group.

Preferably, the polymer has a degree of polymerization of at least 100. More preferably, the polymer has a degree of polymerization in the range of 100-10,000.

The class of polymer having weak acid functional groups and weak base functional groups can be a homopolymer or a copolymer. For example, the repeating unit of such a homopolymer can include both a weak acid functional group and a weak base functional group, e.g., a betaine. By way of another example, a copolymer can have a repeating unit that includes both a weak acid functional group and a weak base functional group, e.g., a betaine, and it can also include non-ionic monomers, i.e., groups that do not ionize with changes in pH, e.g., acrylamide. By way of another example, one of the repeating units of such a copolymer can include a weak acid functional group and one of the other repeating units of the copolymer can include a weak base functional group. It is also contemplated that more than one weak acid functional group, more than one weak base functional group, or more than one of each can be on the same repeating unit. To further illustrate the scope of the class of polymer, the polymer can have a repeating unit ("RU") or repeating units, for example, RU1, RU2, RU3, RU4, etc. containing the following example combinations of repeating units:

TABLE 1

| Example Combination | RU1 | RU2 | RU3 | RU4 |
|---|---|---|---|---|
| #1 | x | x | | |
| #2 | x | x | | x |
| #3 | x | x | x | |
| #4 | x | | x | |
| #5 | | x | x | |
| #6 | x | | x | x |
| #7 | | x | x | x |
| #8 | x | x | x | x |
| #9 | | | x | |
| #10 | | | x | x | where RU1 includes a weak acid functional group;
where RU2 includes a weak base functional group;
where RU3 includes a weak acid functional group and a weak base functional group; and
where RU4 is a nonionic monomer.

It should be understood that a polymer useful in the present inventions can have other repeating units in addition to each of the combinations given above. If there is more than one repeating unit, then the repeating units may be arranged in various sequences as discussed above. Most preferably, the sequence is an alternating distribution of weak acid and weak base functionalities along the polymer molecule chain. Long sequences of one charge may lead to precipitation.

The polymer can be formed by any polymerization method suitable for making the particular polymer, such as via free radical polymerization or ionic polymerization.

Preferably, the polymer is formed from at least one water-soluble monomer. Most preferably, all the different monomers that are used in making a copolymer are water soluble. As used herein, "water soluble" regarding a monomer means that the monomer is at least 1 wt % soluble in deionized water when tested at about 22° C. and at about 1 atmosphere.

In a preferred embodiment, the polymer is formed from at least one monomer having a weak acid functional group that is a carboxylic acid and from at least one monomer having a weak base functional group that is selected from the group consisting of primary, secondary, or tertiary amines. In a presently most-preferred embodiment, the monomer having a weak acid functional group is methacrylic acid (MAA), and the monomer having a weak base functional group is dimethyl aminoethyl methacrylate (DMAEMA). The polymer is preferably formed from ratios of MAA and DMAEMA in the range of 1:4-4:1 on a mole basis.

According to another preferred embodiment of the inventions, a polymer system having the desired capabilities is provided. Each of the polymers of the polymer system may not be capable of providing the desired capabilities specified above (that is, forming a polymer gel at least one middle pH and of dissolving at a low pH and at a high pH), but the polymer system is capable of doing so.

The polymer system includes at least a first polymer and a second polymer. Preferably, the first polymer includes weak acid functional groups, and the second polymer includes weak base functional groups. The first polymer, the second polymer, or both polymers can also include nonionic monomers. The first polymer or second polymer can include both weak acid functional groups and weak base functional groups.

Methods according to the first aspect of the inventions, include the steps of: (a) forming a treatment gel comprising a polymer or polymer system having the desired characteristics; (b) dispersing the treatment gel in a fluid to form a treatment fluid; (c) introducing the treatment gel in the treatment fluid into a portion of a well; and (d) after the step of introducing the treatment gel, adjusting the pH of the treatment gel to at least one pH in the range of 2-4 or 9-12.

The step of forming a treatment gel can be performed as part of a polymerization reaction in an aqueous fluid at a pH in the range of 4-9.

The step of dispersing the treatment gel in a fluid to form a treatment fluid preferably includes the steps of: dicing the treatment gel; combining the diced treatment gel with water; and homogenizing to obtain a dispersion of a microgel of the treatment gel in water. The step of dicing the treatment gel preferably results in the treatment gel in a diced form having an average block size of less than 1 cm$^3$. The step of combining the diced treatment gel with water is preferably to provide a sufficient ratio of treatment gel to water for the homogenizing step. Preferably, the ratio of the diced treatment gel to water is in the range of 1:5-1:50. The step of homogenizing the treatment gel in the water is adapted to form a dispersion of the treatment gel in water. The dispersion preferably is of a microgel having a particle size in the range of 1 micrometers (μm)-300 micrometers (μm). The polymer gel is preferably in the range of 2%-30% by weight of water of the treatment fluid.

Preferably, the aqueous fluid of the treatment fluid has a pH in the range of 4-9. The treatment fluid can include a liquid hydrocarbon. The treatment fluid can include a gas for foaming the treatment fluid. The treatment fluid can include additives. The treatment fluid can be introduced into a portion of a well by pumping the treatment fluid into a wellbore.

Upon or after the step of introducing the treatment gel in the treatment fluid into a portion of a well, the treatment gel can, among other things, form a filtercake on the face of a portion of a subterranean formation.

After the step of introducing the treatment gel in the treatment fluid into a portion of a well, the inventions include the step of adjusting the pH of the treatment gel to at least one pH in the range of 2-4 or at least one pH in the range of 9-12. Preferably, the pH is adjusted in one of these ranges at least sufficiently to dissolve the treatment gel, whereby the treatment gel dissolves due to a reduction in the electrostatic attraction of the cross-linked polymer. A portion of the treatment gel can be dissolved by the backbone chain of the polymer being broken; however, preferably the treatment gel should dissolve primarily by a reduction in the electrostatic attraction. Preferably, the electrostatic attraction is reduced sufficiently to allow at least a portion of the treatment gel to be flowed out of the well.

The pH of the treatment gel can be adjusted by introducing a pH-adjusting agent into the portion of the well. Preferably, the pH-adjusting agent is introduced in at least a sufficient concentration to dissolve the treatment gel.

The pH-adjusting agent can be a strong acid. As used herein, a "strong acid" is an acid with a $pK_a$ of less than 2.0. The strong acid dissolves the treatment gel by switching the charge off on at least some of the weak acid functional groups. The strong acid can be selected from, but not limited to, sulfuric, hydrochloric, nitric acid, and any combination thereof in any proportion. Preferably, the strong acid decreases the pH of the treatment gel below 4.

The pH-adjusting agent can be a strong base. As used herein, a "strong base" is a base with a $pK_b$ of greater than 10. The strong base dissolves the treatment gel by switching off the charge on at least some of the weak base functional groups. The strong base can be selected from, but not limited to, calcium oxide, sodium hydroxide, sodium carbonate, potassium hydroxide, potassium carbonate, and any combination thereof in any proportion. Preferably, the strong base increases the pH of the treatment gel above 9.

The pH-adjusting agent can be in a delayed-release form. For example, the pH-adjusting agent can be in a delayed-release capsule. By way of another example, the pH-adjusting agent can be a delayed release acid, such as a polylactic acid, which degrades over time to release lactic acid. If the pH-adjusting agent is in a delayed-release form, the pH-adjusting agent can be introduced simultaneously with the treatment gel. Preferably, the pH-adjusting agent is released at a sufficiently later time to allow the treatment gel to reach the desired portion of the well before dissolving. The pH-adjusting agent can be introduced as an overflush, wherein the pH-adjusting agent is introduced into the well after the step of introducing the treatment gel.

Once the treatment gel is dissolved, the present inventions can also include the step of removing the dissolved treatment gel from the portion of the well. For example, the dissolved treatment gel can be flowed back from the portion of the well. By way of another example, the treatment gel can be introduced through an injection well, and the dissolved treatment gel can be flowed through a production well.

EXAMPLES

To facilitate a better understanding of the present inventions, the following example of certain aspects of a preferred embodiment is given. The following example is not the only example which could be given according to the present inventions and is not intended to limit the scope of the inventions.

A gel block was synthesized via free radical polymerization of dimethyl aminoethyl methacrylate (DMAEMA) and methacrylic acid (MAA). In a 20 wt % case, an aqueous solution comprising 10 wt % DMAEMA and 10 wt % MAA (1.1 mol % DMAEMA and 2.1 mol % MAA in water) was reacted using potassium persulfate ($K_2S_2O_8$) as the initiator. The reaction was carried out at 70° C. under aerobic conditions in a beaker.

A 20 $cm^3$ gel block was initially diced with a scalpel to obtain an average size of less than 1 $cm^3$ of the gel block (by visual inspection). The diced gel block was transferred to a beaker and then mixed with 100 $cm^3$ of deionized water. The blades of a Polytron PT 1600® homogenizer (from Kinematica, Inc.) were lowered into the beaker, then the homogenizer was switched on and set to 25,000 rpm. The homogenization process was allowed to progress for 20 minutes. This process produced a 20 vol % suspension of microgels in water.

Figure 2:
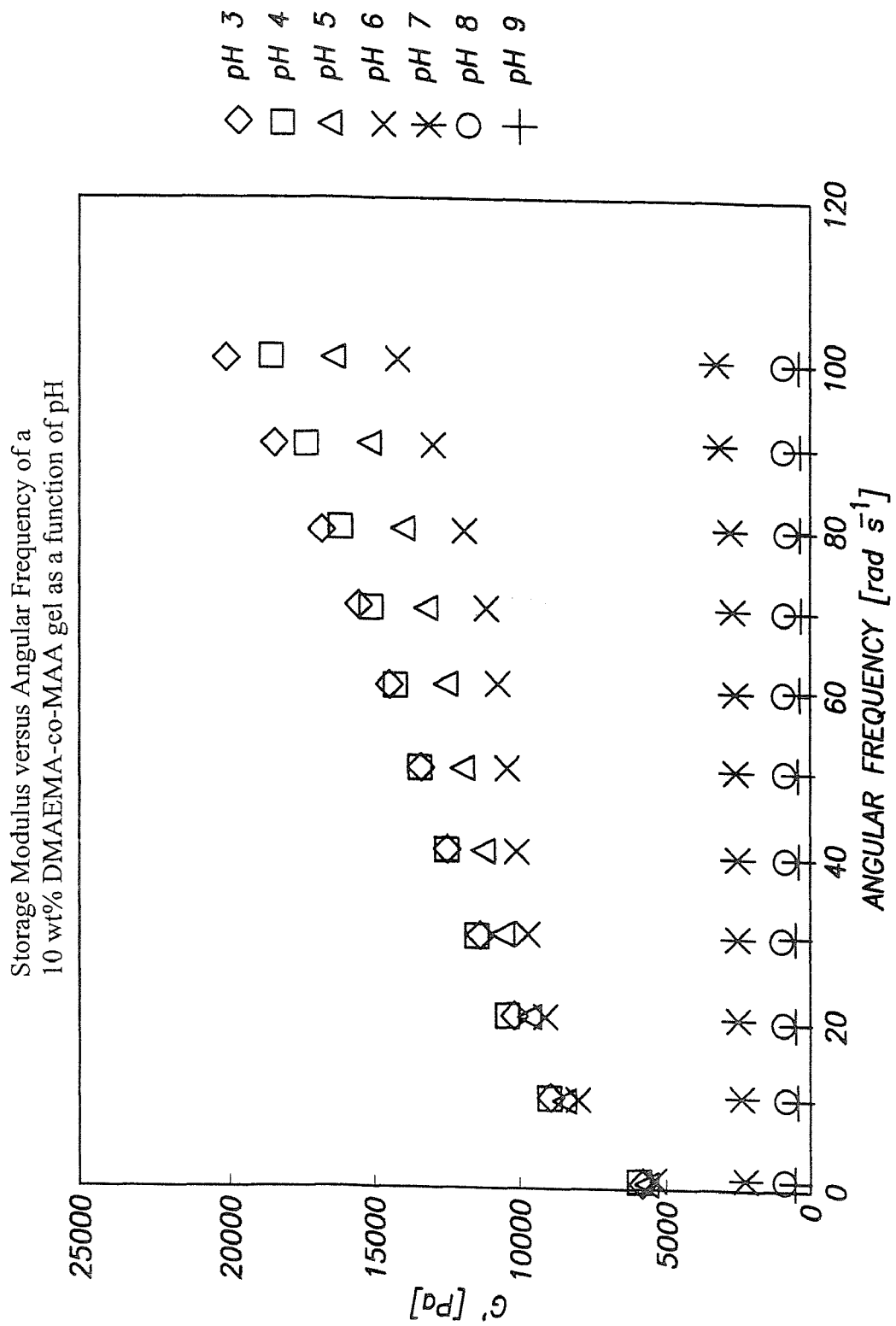
FIG. 2 is a graph of the storage modulus versus angular frequency of a polymer gel at 10 wt % monomers in water.
Figure 3:
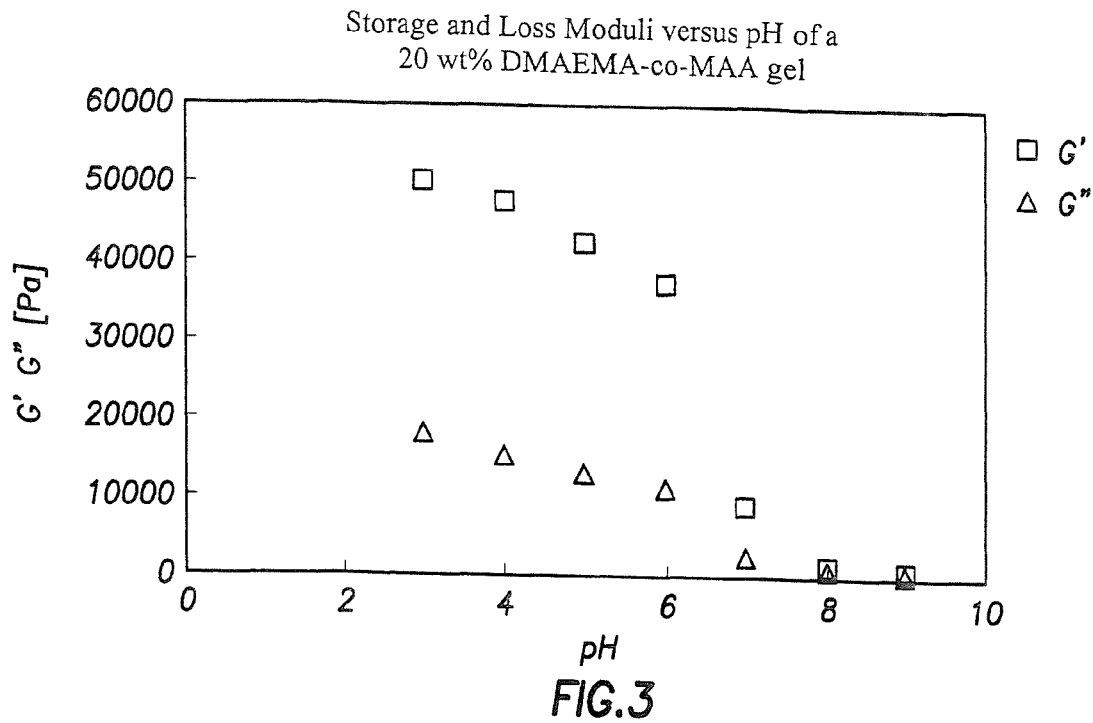
FIG. 3 is a graph of the storage modulus and loss modulus versus pH of a polymer gel at 20 wt % monomers in water.
Figure 4:
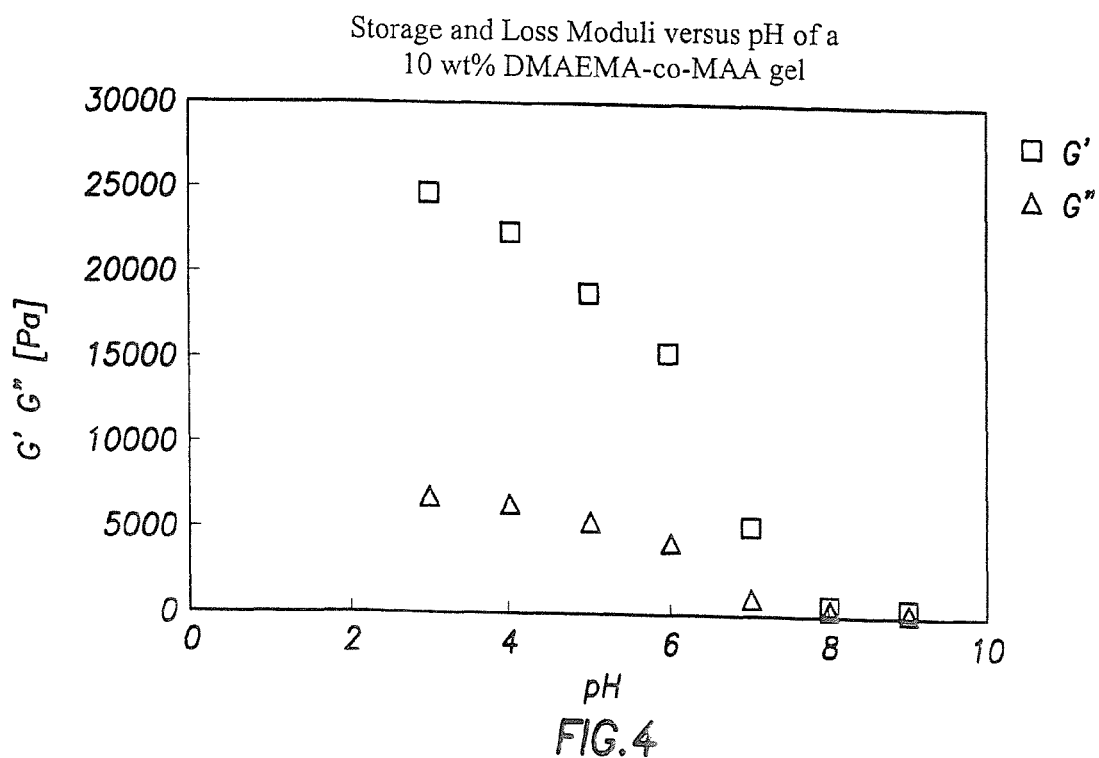
FIG. 4 is a graph of the storage modulus and loss modulus versus pH of a polymer gel at 10 wt % monomers in water.

FIGS. 1-4 illustrate the oscillatory rheology of a polymer formed from dimethyl aminoethyl methacrylate (DMAEMA) and methacrylic acid (MAA) monomers. FIG. 1 graphs the storage modulus (G') of DMAEMA-co-MAA gel made with 20 wt % monomers in water versus angular frequency as a function of pH. The ratio of DMAEMA to MAA is 1:1 (w/w). Strain=10%; Load=60 Pa (Pascals), 70 rad/sec, 25° C. FIG. 2 graphs the storage modulus (G') of DMAEMA-co-MAA gel made with 10 wt % monomers in water versus angular frequency as a function of pH. The ratio of DMAEMA to MAA is 1:1 (w/w). Strain=10%; Load=60 Pa (Pascals), 70 rad/sec, 25° C. FIG. 3 graphs the storage modulus (G') and loss modulus (G") of DMAEMA-co-MAA gel made with 20 wt % monomers in water versus pH. The ratio of DMAEMA to MAA is 1:1 (w/w). Strain=10%; Load=60 Pa (Pascals), 70 rad/sec, 25° C. FIG. 4 graphs the storage modulus (G') and loss modulus (G") of DMAEMA-co-MAA gel made with 10 wt % monomers in water versus pH. The ratio of DMAEMA to MAA is 1:1 (w/w). Strain=10%; Load=60 Pa (Pascals), 70 rad/sec, 25° C.

Figure 5:
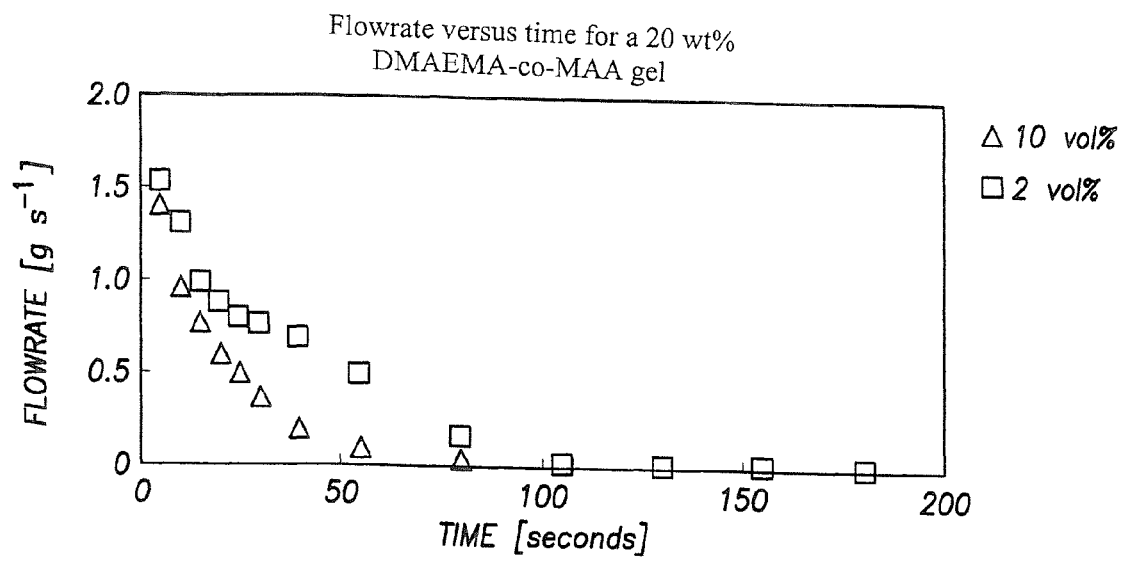
FIG. 5 is a flow graph of mass versus time of a polymer microgel at 20 wt % monomers for blocking a bed.
Figure 6:
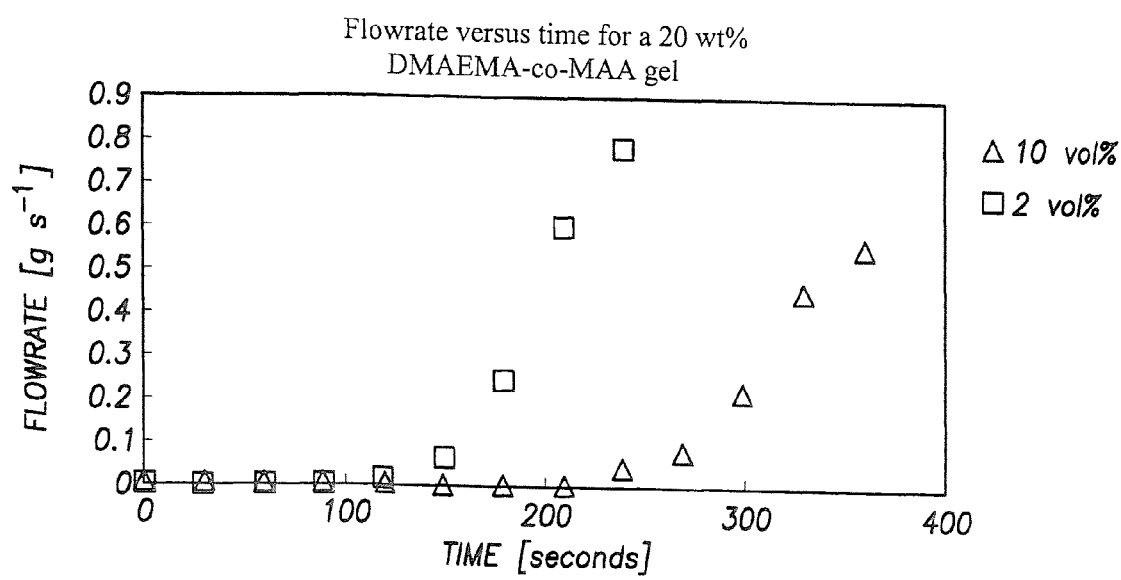
FIG. 6 is a flow graph of mass versus time of a polymer microgel at 20 wt % monomers for unblocking a bed.

FIGS. 5-8 illustrate the capability of the microgel to restrict fluid flow and dissolve to regain fluid flow through a bed of glass beads. The bed was made of 4 cm of randomly-packed glass beads having a particle size of 200 micrometers (μm). The experimental conditions for the data in FIGS. 5-8 were a pressure of 2 atmospheres (atm), 25° C., and a ratio of DMAEMA to MAA of 1:1 (w/w). FIG. 5 is a flow curve of mass versus time collected for suspensions of DMAEMA-co-MAA microgel in water. First, a polymer gel of DMAEMA-co-MAA was formed using 20 wt % monomers in water. The polymer gel was then diced and microgel suspensions were formed using 2% and 10% volume suspensions of microgels in water. The flow curves demonstrate the ability of the microgel suspensions to completely restrict fluid flow through the packed bed. FIG. 6 is a similar flow curve as in FIG. 5 with the same chopped microgel suspensions. Water at pH 12 was then placed on top of the gel and pressure of 2 atmospheres was applied. Initially no water flowed through, but as the gel degraded, increasing amounts of water flowed through as shown in FIG. 6.

Figure 7:
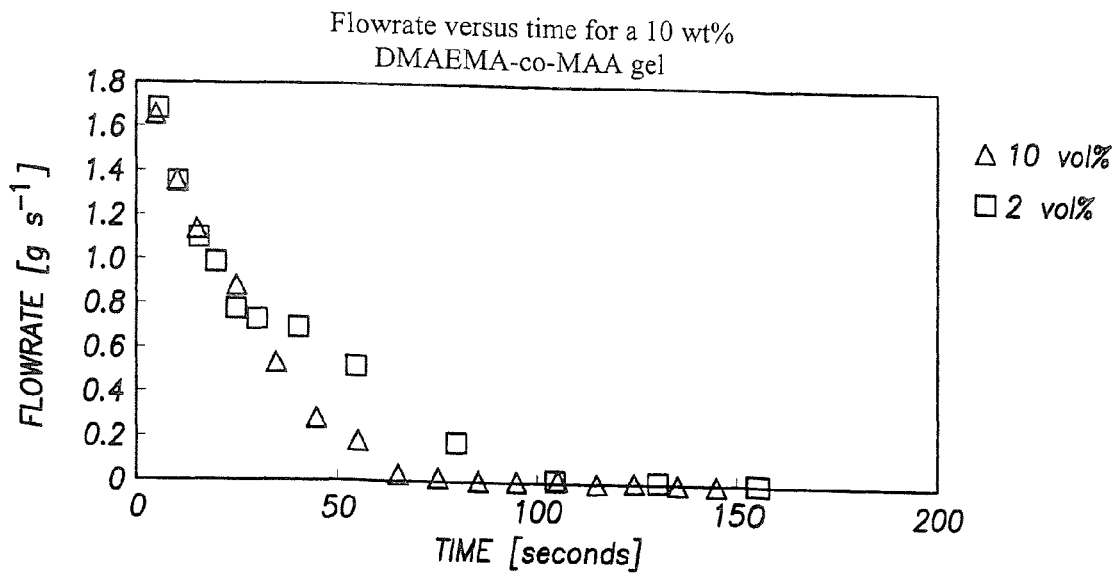
FIG. 7 is a flow graph of mass versus time of a polymer microgel at 10 wt % monomers for blocking a bed.
Figure 8:
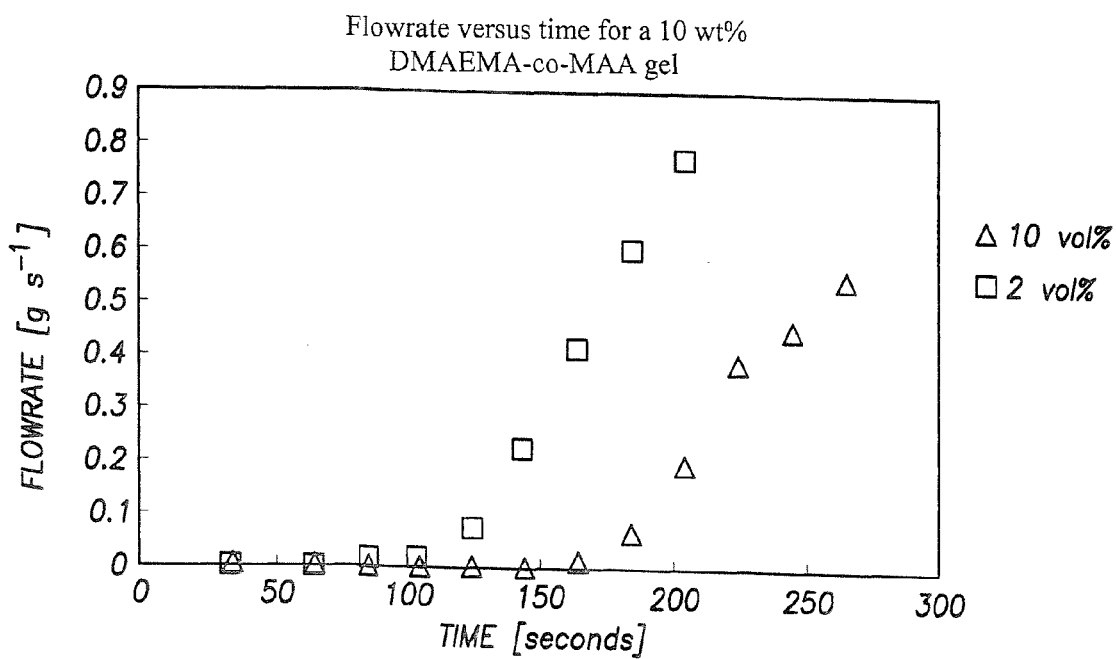
FIG. 8 is a flow graph of mass versus time of a polymer microgel at 10 wt % monomers for unblocking a bed.

FIG. 7 is a flow curve of mass versus time collected for suspensions of DMAEMA-co-MAA microgel in water. First, a polymer gel of DMAEMA-co-MAA was formed using 10 wt % monomers in water. The polymer gel was then diced and microgel suspensions were formed using 2% and 10% volume suspensions of microgels in water. The flow curves demonstrate the ability of the microgel suspensions to completely restrict fluid flow through the packed bed. FIG. 8 is a similar flow curve as in FIG. 7 with the same chopped microgel suspensions. Water at pH 12 was placed on top of the gel and pressure of 2 atmospheres was applied. Initially no water flowed through, but as the gel degraded, increasing amounts of water flowed through as shown in FIG. 8.

What is claimed is:

1. A method of treating a portion of a well, the method comprising the steps of:
 (a) forming a treatment gel comprising a polymer system of a mixture of two or more polymers,
  wherein the polymer system is capable of each of the following, when tested at least one concentration in the range of 2-10 times C* in deionized water, at about 22° C., and at about 1 atmosphere pressure:
  (i) forming a polymer gel of the polymer system and water at least one pH in the range of 4-9, wherein a bulk form of the polymer gel has a G' greater than G" at all frequencies in the range of 1 rad/sec-100 rad/sec;
  (ii) dissolving at least one pH of less than 4; and
  (iii) dissolving at least one pH of greater than 9;
  wherein the polymer system comprises at least a first polymer and a second polymer; and
  wherein the first polymer and second polymer have a degree of polymerization of at least 100;
 (b) dispersing the treatment gel in a fluid to form a treatment fluid;
 (c) introducing the treatment gel in the treatment fluid into a portion of a well; and
 (d) after the step of introducing the treatment gel, adjusting the pH of the treatment gel to at least one pH in the range of 2-4 or 9-12.

2. The method according to claim 1, wherein the polymer system is capable of forming a polymer gel at every pH in the pH range of 5-8.

3. The method according to claim 1, wherein the first polymer comprises weak acid functional groups, and the second polymer comprises weak base functional groups.

4. The method according to claim 3, wherein the first polymer or second polymer comprise nonionic repeating units.

5. The method according to claim 3, wherein the first polymer has a ratio of at least one mole of weak acid functional groups per mole of the first polymer and the second polymer has a ratio of at least one mole of weak base functional groups per mole of the second polymer.

6. The method according to claim 3, wherein the first polymer contains at least 10% weak acid functional groups based on the degree of polymerization of the polymer.

7. The method according to claim 3, wherein the second polymer contains at least 10% weak base functional groups based on the degree of polymerization of the polymer.

8. The method according to claim 3, wherein the first polymer contains 10%-70% weak acid functional groups based on the degree of polymerization of the polymer.

9. The method according to claim 3, wherein the second polymer contains 10%-70% weak base functional groups based on the degree of polymerization of the polymer.

10. The method according to claim 3, wherein the weak acid functional groups of the first polymer have a ratio to the weak base functional groups of the second polymer that is in the range of 1:4-4:1 on a mole basis.

11. The method according to claim 1, wherein the first polymer and second polymer have a degree of polymerization in the range of 100-10,000.

12. The method according to claim 1, wherein the first polymer or second polymer is a copolymer.

13. The method according to claim 3, wherein the weak acid functional groups are carboxylic acids, and wherein the weak base functional groups are selected from the group consisting of primary amines, secondary amines, tertiary amine, and any combination thereof in any proportion.

14. The method according to claim 13, wherein the first polymer is formed from at least methacrylic acid monomer and the second polymer is formed from at least dimethyl aminoethyl methacrylate monomer.

15. The method according to claim 14, wherein the polymer system is formed from mole ratios of methacrylic acid and dimethyl aminoethyl methacrylate monomers in the range of 4:1-1:4.

16. The method according to claim 1, wherein the step of forming the treatment gel comprises mixing the polymer system with an aqueous fluid at a pH in the range of 4-9.

17. The method according to claim 1, wherein the step of dispersing comprises forming a microgel of the treatment gel in water.

18. The method according to claim 1, wherein the treatment fluid comprises an aqueous solution having a pH in the range of 4-9.

19. The method according to claim 1, wherein the step of adjusting comprises introducing a pH-adjusting agent into the portion of the well.

20. The method according to claim 1, wherein the step of adjusting dissolves the treatment gel, and further comprising the step of removing the dissolved treatment gel from the portion of the well.

21. A method of treating a portion of a well, the method comprising the steps of:
 (a) forming a treatment gel comprising a polymer system of a mixture of two or more polymers,
  wherein the polymer system is capable of each of the following, when tested at least one concentration in the range of 2-10 times C* in deionized water, at about 22° C., and at about 1 atmosphere pressure:
  (i) forming a polymer gel of the polymer system and water at least one pH in the range of 4-9, wherein a bulk form of the polymer gel has a G' greater than G" at all frequencies in the range of 1 rad/sec-100 rad/sec;
  (ii) dissolving at least one pH of less than 4; and
  (iii) dissolving at least one pH of greater than 9;
  wherein the polymer system comprises at least a first polymer and a second polymer; and
  wherein the first polymer or second polymer is a copolymer;
 (b) dispersing the treatment gel in a fluid to form a treatment fluid;
 (c) introducing the treatment gel in the treatment fluid into a portion of a well; and
 (d) after the step of introducing the treatment gel, adjusting the pH of the treatment gel to at least one pH in the range of 2-4 or 9-12.

22. A method of treating a portion of a well, the method comprising the steps of:
 (a) forming a treatment gel comprising a polymer system of a mixture of two or more polymers,
  wherein the polymer system is capable of each of the following, when tested at least one concentration in the range of 2-10 times C* in deionized water, at about 22° C., and at about 1 atmosphere pressure:
  (i) forming a polymer gel of the polymer system and water at least one pH in the range of 4-9, wherein a bulk form of the polymer gel has a G' greater than G" at all frequencies in the range of 1 rad/sec-100 rad/sec;

(ii) dissolving at least one pH of less than 4; and (iii) dissolving at least one pH of greater than 9;

wherein the polymer system comprises at least a first polymer and a second polymer;

wherein the first polymer comprises weak acid functional groups, and the second polymer comprises weak base functional groups; and wherein the first polymer contains at least 10% weak acid functional groups based on the degree of polymerization of the polymer;

(b) dispersing the treatment gel in a fluid to form a treatment fluid;

(c) introducing the treatment gel in the treatment fluid into a portion of a well; and (d) after the step of introducing the treatment gel, adjusting the pH of the treatment gel to at least one pH in the range of 2-4 or 9-12.

23. A method of treating a portion of a well, the method comprising the steps of:

(a) forming a treatment gel comprising a polymer system of a mixture of two or more polymers, wherein the polymer system is capable of each of the following, when tested at least one concentration in the range of 2-10 times C* in deionized water, at about 22° C., and at about 1 atmosphere pressure:

(i) forming a polymer gel of the polymer system and water at least one pH in the range of 4-9, wherein a bulk form of the polymer gel has a G' greater than G" at all frequencies in the range of 1 rad/sec-100 rad/sec;

(ii) dissolving at least one pH of less than 4; and (iii) dissolving at least one pH of greater than 9;

wherein the polymer system comprises at least a first polymer and a second polymer;

wherein the first polymer comprises weak acid functional groups, and the second polymer comprises weak base functional groups; and wherein the second polymer contains at least 10% weak base functional groups based on the degree of polymerization of the polymer;

(b) dispersing the treatment gel in a fluid to form a treatment fluid;

(c) introducing the treatment gel in the treatment fluid into a portion of a well; and (d) after the step of introducing the treatment gel, adjusting the pH of the treatment gel to at least one pH in the range of 2-4 or 9-12.

* * * * *